(12) United States Patent
Li et al.

(10) Patent No.: US 11,617,167 B2
(45) Date of Patent: Mar. 28, 2023

(54) ENHANCED TRAFFIC CO-EXISTENCE WITH MULTI-PANEL USER EQUIPMENT (UE)

(71) Applicant: Nokia Technologies Oy, Espoo (FI)

(72) Inventors: Zexian Li, Espoo (FI); Guillermo Pocovi, Aalborg (DK); Qiping Zhu, Wheaton, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 139 days.

(21) Appl. No.: 17/163,994

(22) Filed: Feb. 1, 2021

(65) Prior Publication Data

US 2022/0248394 A1    Aug. 4, 2022

(51) Int. Cl.
| | |
|---|---|
| H04W 72/04 | (2009.01) |
| H04L 5/00 | (2006.01) |
| H04W 16/14 | (2009.01) |
| H04W 72/0446 | (2023.01) |

(52) U.S. Cl.
CPC ....... *H04W 72/0413* (2013.01); *H04L 5/0048* (2013.01); *H04W 16/14* (2013.01); *H04W 72/042* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2021/0022006 A1* | 1/2021 | Sun | .................... | H04W 8/24 |
| 2021/0168714 A1* | 6/2021 | Guan | .................... | H04B 7/0695 |
| 2022/0078728 A1* | 3/2022 | Yi | .................... | H04W 72/1263 |
| 2022/0159701 A1* | 5/2022 | Islam | .................... | H04L 5/0094 |

FOREIGN PATENT DOCUMENTS

| | | |
|---|---|---|
| WO | 2020/030010 A1 | 2/2020 |
| WO | 2020/227103 A1 | 11/2020 |

OTHER PUBLICATIONS

Invitation to Pay Additional Fees received for corresponding Patent Cooperation Treaty Application No. PCT/EP2021/087548, dated Apr. 29, 2022, 9 pages.
International Search Report and Written Opinion received for corresponding Patent Cooperation Treaty Application No. PCT/EP2021/087548, dated Jun. 22, 2022, 16 pages.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

(Continued)

*Primary Examiner* — Clemence S Han
(74) *Attorney, Agent, or Firm* — Squire Patton Boggs (US) LLP (57) ABSTRACT

Certain example embodiments provide systems, methods, apparatuses, and computer program products for enhanced traffic co-existence with multi-panel user equipment (UE). For example, certain embodiments may avoid excess dropping and/or cancellation. Taking inter-UE uplink (UL) prioritization as one example, whenever a network node has to accommodate higher-priority traffic on resources overlapping with ongoing and/or incoming lower-priority transmissions, certain embodiments may instruct a UE to transmit on spare antenna panel(s).

16 Claims, 7 Drawing Sheets

(56) References Cited

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.
"3rd Generation Partnership Project; Technical Specification Group Radio Access Network; NR; Physical layer procedures for data (Release 16)", 3GPP TS 38.214, V16.3.0, Sep. 2020, pp. 1-166.
"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.
"3rd Generation Partnership Project; Technical Specification Group Radio Access Network; NR; Physical layer procedures for control (Release 16)", 3GPP TS 38.213, V16.3.0, Sep. 2020, pp. 1-179.

* cited by examiner

ENHANCED TRAFFIC CO-EXISTENCE WITH MULTI-PANEL USER EQUIPMENT (UE)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for enhanced traffic co-existence with multi-panel user equipment (UE).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include transmitting, to a network node, information indicating at least one or more spare panels of a user equipment and whether the user equipment supports continuing a transmission on the one or more spare panels. The method may include receiving, from the network node, a configuration of one or more cancellation operations to be performed upon cancellation of one or more uplink transmissions. The method may include receiving, from the network node, information indicating the cancellation of the one or more uplink transmissions or overlapping resource allocations resulting in the cancellation of the one or more uplink transmissions.

In a variant, the method may further include transmitting the one or more cancelled uplink transmissions via the one or more spare panels. In a variant, the method may further include receiving, from the network node, information indicating a subset of the one or more spare panels on which the one or more cancelled uplink transmissions can be transmitted, and the transmitting of the one or more cancelled transmissions may include transmitting the one or more cancelled uplink transmissions via the subset of the one or more spare panels. In a variant, the receiving of the information indicating the subset may include receiving the information indicating the subset in connection with the receiving of the configuration, or receiving the information indicating the subset in connection with the receiving of the information indicating the cancellation. In a variant, the information indicating the one or more spare panels may further include at least one of one or more panel identifiers, one or more panel-dedicated channel quality indicator reports, or one or more panel-dedicated sounding reference signal resource indicators, or one or more transmit precoding matrix indexes.

In a variant, the method may further include receiving an indication of one or more resources or transmission parameters for a transmission of the one or more cancelled uplink transmissions, and transmitting the one or more cancelled uplink transmissions via the one or more spare panels according to the one or more resources or transmission parameters. In a variant, the receiving of the configuration of the one or more cancellation operations may include receiving the configuration via downlink control information, receiving the configuration via a medium access control control element, or receiving the configuration via radio resource control signalling. In a variant, the configuration of the one or more cancellation operations may further include a configuration of one or more search spaces where the user equipment can attempt to decode the downlink control information or a payload size of the downlink control information.

In a variant, the method may further include receiving a scheduling of one or more physical uplink shared channels or one or more uplink grants for the one or more cancelled uplink transmissions. In a variant, the method may further include transmitting one or more other uplink transmissions received via one or more other panels of the user equipment.

According to a second embodiment, a method may include receiving, from a user equipment, information indicating at least one or more spare panels of the user equipment and whether the user equipment supports continuing a transmission on the one or more spare panels. The method may include transmitting, to the user equipment, a configuration of one or more cancellation operations to be performed upon cancellation of one or more uplink transmissions. The method may include transmitting, to the user equipment, information indicating the cancellation of the one or more uplink transmissions or overlapping resource allocations resulting in the cancellation of the one or more uplink transmissions.

In a variant, the method may further include transmitting, to the user equipment, information indicating a subset of the one or more spare panels on which the one or more cancelled uplink transmissions can be transmitted, and receiving the one or more cancelled uplink transmissions via the subset of the one or more spare panels. In a variant, the transmitting of the information indicating the subset may include transmitting the information indicating the subset in connection with the transmitting of the configuration, or transmitting the information indicating the subset in connection with the transmitting of the information indicating the cancellation. In a variant, the one or more spare panels may further include at least one of one or more panel identifiers, one or more panel-dedicated channel quality indicator reports, or one or more panel-dedicated sounding reference signal resource indicators, or one or more transmit precoding matrix indexes.

In a variant, the method may further include transmitting an indication of one or more resources or transmission parameters for a transmission of the one or more cancelled uplink transmissions, and receiving the one or more cancelled uplink transmissions via the one or more spare panels according to the one or more resources or transmission parameters. In a variant, the transmitting of the configuration of the one or more cancellation operations may include transmitting the configuration via downlink control information, transmitting the configuration via a medium access control control element, or transmitting the configuration via radio resource control signaling.

In a variant, the configuration of the one or more cancellation operations may further include a configuration of one or more search spaces where the user equipment can attempt to decode the downlink control information or a payload size of the downlink control information. In a variant, the method may further include transmitting a scheduling of one or more physical uplink shared channels or one or more uplink grants for the one or more cancelled uplink transmissions. In a variant, the method may further include receiving one or more other uplink transmissions received via one or more other panels of the user equipment, determining to not drop the one or more other uplink transmissions received via the one or more other panels of the user equipment, and processing the one or more uplink transmissions and the one or more other uplink transmissions.

According to a third embodiment, a method may include receiving information indicating at least one or more spare beams of a user equipment and whether the user equipment supports continuing a transmission on the one or more spare beams. The method may include transmitting, to the user equipment, an instruction to switch from a first beam to a second beam for continuing the transmission. The transmission of the user equipment may have been interrupted on the first beam. The third embodiment may include one or more of the variants described above.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to cause the apparatus to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the first embodiment, the second embodiment, or the third embodiment, or any of the variants discussed above.

An eighth embodiment may be directed to a computer program product encoding instructions for causing an apparatus to perform at least the method according to the first embodiment, the second embodiment, or the third embodiment, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhanced traffic co-existence with multi-panel UE is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Industrial Internet of Things (IIoT) and URLLC may be some of the usage scenarios (eMBB, URLLC and mMTC) related to NR design, which may be driven by various applications and/or services from different vertical domains, for example, factory automation. Another related aspect may include the frequency used for 5G. NR may use two frequency ranges (FRs): FR1 (sub 6 gigahertz (GHz)) and FR2 (24.25 to 52.6 GHz). With the introduction of higher frequencies, it may be more feasible and important for the UE to have multiple antenna panels. There may be different assumptions for multi-panel UE (MPUE) operations. For example, a first MPUE assumption may be that multiple panels are implemented on a UE where just one panel can be activated at a time, with panel switching and/or activation delay of X milliseconds (ms). A second MPUE assumption may be that multiple panels are implemented on a UE where multiple panels can be activated at a time and one or more panels can be used for transmit (Tx). A third MPUE assumption may be that multiple panels are implemented on a UE where multiple panels can be activated at a time but just one panel can be used for Tx.

There may be a need for prioritization between different traffic and/or UEs, e.g., where the low priority one may be dropped or cancelled. To be more specific, for example, in the case of inter-UE prioritization where the resources allocated to an eMBB UE and another URLLC UE are overlapping (both downlink (DL) and UL), the eMBB UE's traffic may be interrupted and/or dropped. One example related to UL cancellation may include the eMBB PUSCH transmission being cancelled after the eMBB UE receives group common (GC) downlink control information (DCI) with UL cancellation indication (CI). Physical layer (PHY) priority index may be introduced, for example, for physical uplink control channel (PUCCH) and physical uplink shared channel (PUSCH) for intra-UE prioritization. If there is overlap between the resources of channels with different priority indexes, the low priority channel may be dropped and/or cancelled. The dropping and/or cancellation may result in increased latency for the cancelled channels (e.g., for extended reality (XR) usage), which might have certain requirements as well (although not to the same degree as a high priority channel for, e.g., haptic feedback). In addition, there may be reduced spectral efficiency as well since the dropping can lead to unnecessary retransmission.

With the operation of higher frequency, such as FR2, certain deployment scenarios may utilize multi-panel UEs which may be capable of simultaneous transmission and/or reception via different panels. With the enhanced capability of MPUEs, there may not be a need to drop or cancel transmissions. As such, there may be a need to avoid excess dropping and/or cancellation in cases where there are overlapping allocated resources.

Some embodiments described herein may provide for enhanced traffic co-existence with multi-panel UE. For example, certain embodiments may avoid excess dropping and/or cancellation. Taking inter-UE UL prioritization as one example, whenever a network node (e.g., a gNB) has to accommodate higher-priority traffic on resources overlapping with ongoing and/or incoming lower-priority transmissions, certain embodiments may instruct a UE to transmit on spare antenna panel(s), thereby avoiding excess dropping and/or cancellation of UL data. Certain embodiments may be applied to other scenarios, e.g., intra-UE prioritization.

In certain embodiments, based on information of multi-panel support at the UE (e.g., based on signalling of a UE capability and/or feature group), a network node may configure the UE with one or more cancellation operations. This may impact radio resource control (RRC) and/or may have medium access control (MAC) and PHY impact, depending on the implementation of certain embodiments. When there may be a need to interrupt ongoing UL transmission(s) to accommodate higher-priority traffic, new group common (GC) or dedicated signalling or extensions to the existing signalling may be used to indicate to the MPUE which spare panel(s) can be used for continuing transmission, as well as, in some embodiments, a new resource or transmission parameter for continuing the transmission. This may have a PHY impact and/or a MAC impact or other protocol layers depending of the embodiment.

At the UE, after detecting the cancellation indicator and the new resource for continuing transmission, the UE may switch to the indicated panel for continuing UL transmission. At the network node, there may not be a need to drop a partially received signal. The signal can be used together with later received signalling from the other panel. Certain embodiments may be relevant for multi-transmit receive point (TRP) scenarios where the panel for continuing the transmission may point to another non-colocated TRP and combined afterwards in a central node.

Figure 1:
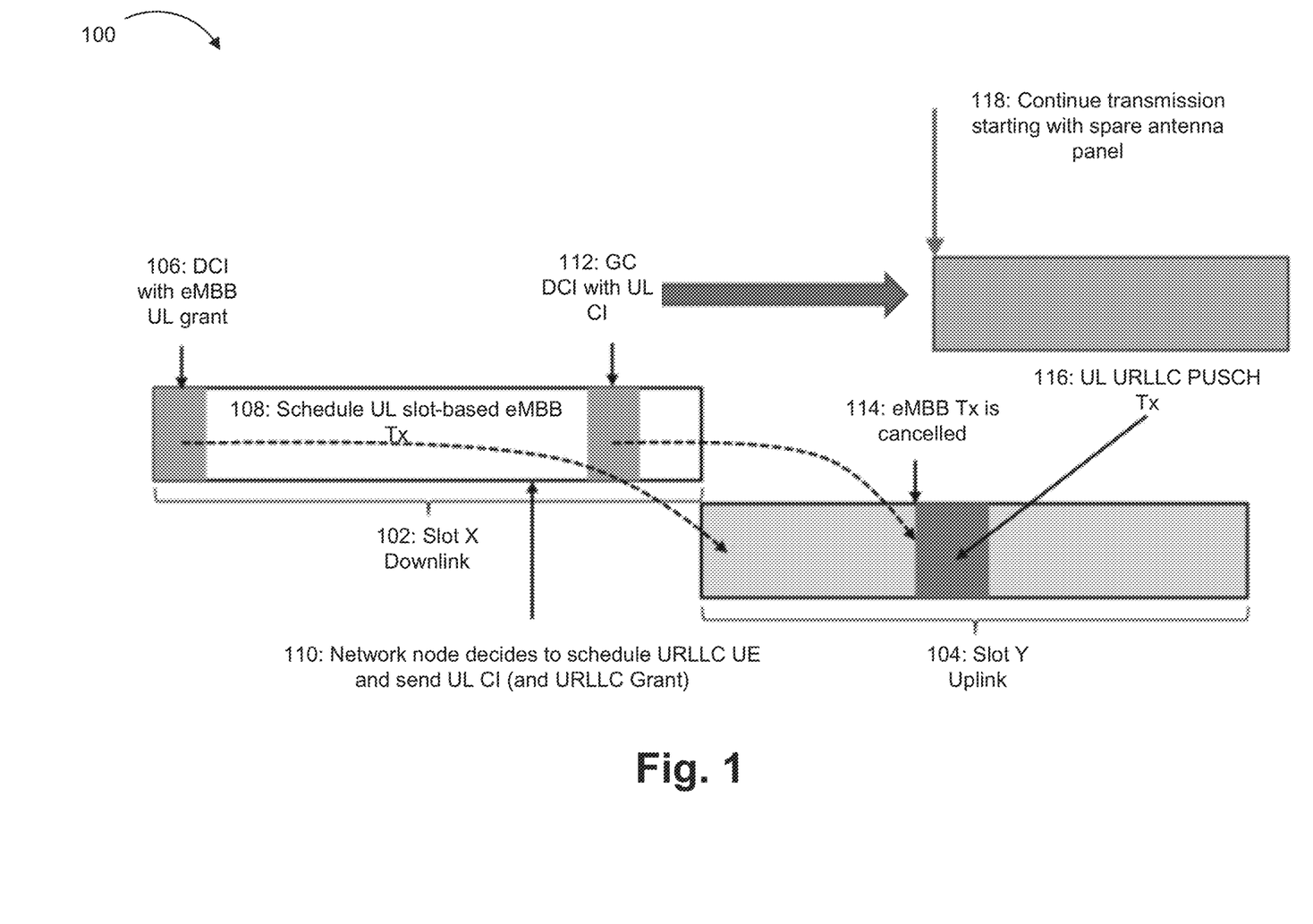
FIG. 1 illustrates an example of continuing transmission with a spare antenna panel after receiving an uplink (UL) cancellation indication (CI), according to some embodiments.

FIG. 1 illustrates an example 100 of continuing transmission with a spare antenna panel after receiving UL CI, according to some embodiments. The example 100 includes, at 102, a slot X for downlink and, at 104, a slot Y for uplink. As illustrated at 106, a portion of the slot X may be used for DCI with an eMBB UL grant. As illustrated at 108, a network node may schedule UL slot-based eMBB Tx in the slot Y. As illustrated at 110, the network node may decide to schedule the URLLC UE and may send the UL CI (and URLLC grant). As illustrated at 112, a portion of slot X may be used for GC DCI with UL CI. As illustrated at 114, the eMBB Tx may be cancelled. As illustrated at 116, a portion of the slot Y may be used for UL URLLC PUSCH Tx. As illustrated at 118, the UE may continue transmission starting with a spare antenna panel.

As described above, FIG. 1 is provided as an example. Other examples are possible, according to some embodiments.

Figure 2:
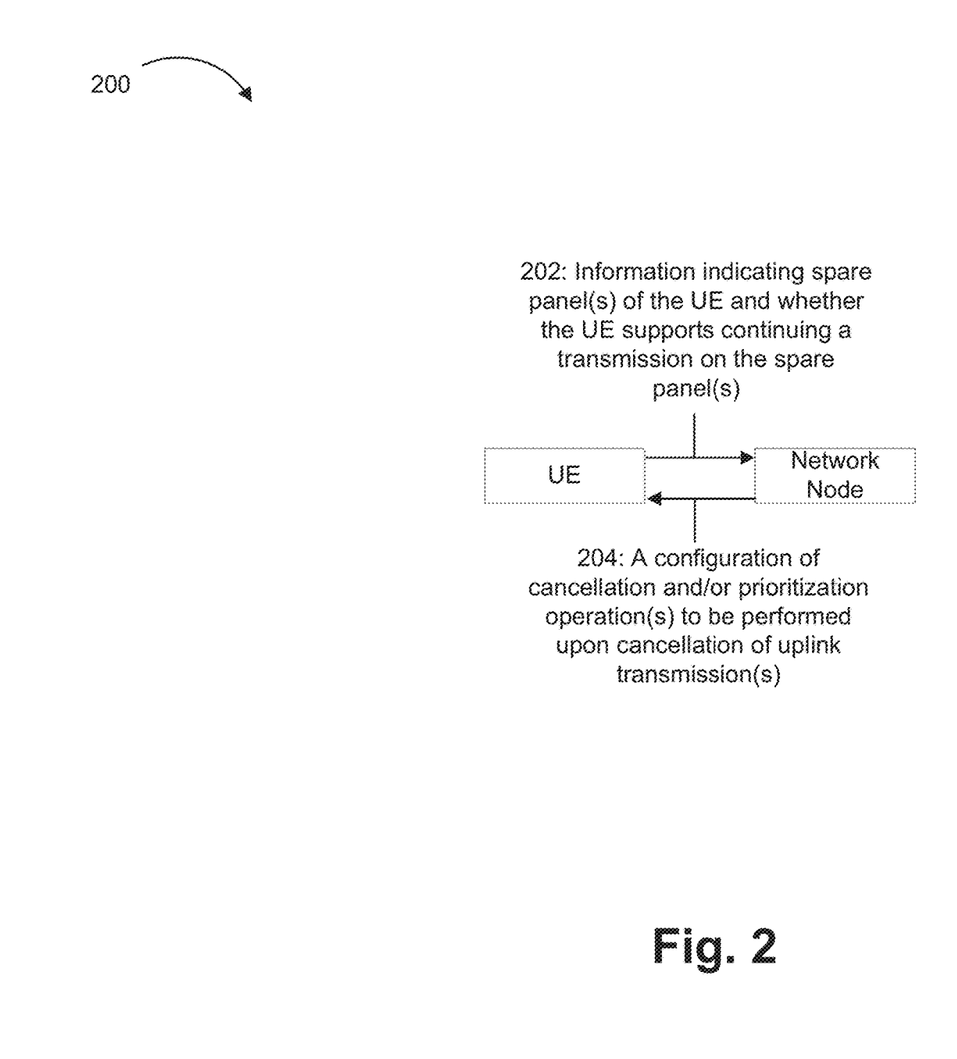
FIG. 2 illustrates an example of enhanced traffic co-existence with multi-panel UE, according to some embodiments.

FIG. 2 illustrates an example 200 of enhanced traffic co-existence with multi-panel UE, according to some embodiments. As illustrated in FIG. 2, the example 200 includes a UE and a network node (e.g., a gNB). As illustrated at 202, the UE may transmit, to the network node, information indicating spare panel(s) of the UE and whether the UE supports continuing a transmission on the spare panel(s). For example, the UE may provide information, to the network node related to its spare panel(s), in addition to whether the UE supports continuing the transmission on a different panel than the panel it is currently using (or is configured to use) for a transmission. Information on the spare panel(s) can be signaled to the network node, e.g., in the form of a panel identifier, a panel dedicated channel quality indicator (CQI) report, and/or a panel dedicated sounding reference signal (SRS) resource indicator (SRI) and/or a transmit precoding matric indicator (TPMI).

As illustrated at 204, the network node may transmit, to the UE, a configuration of cancellation and/or prioritization operation(s) to be performed upon cancellation of uplink transmission(s). In certain embodiments, together with the UL cancellation indication, the network node can additionally indicate to the UE which spare panel(s) can be used for continuing transmission, in addition to a resource (e.g., a time-frequency resource) for continuing the transmission. In some embodiments, the cancellation indication may include a 1-bit or multi-bit flag instructing the UE to switch to a spare panel (e.g., without explicit indication of which panel to use) and/or one or more transmission power control (TPC) parameters, radio resources, modulation and coding schemes (MCS), and/or the like.

Different signalling options are possible for the operations at 204, including cases with GC and dedicated DCI. In an example with GC DCI, where format 2_4 DCI (which may be used for carrying the cancellation indication) is the default, different implementation options are possible. As a first example option, the network node may explicitly dynamically indicate, for each UE, which spare panel(s) the UE is to use for transmitting the cancelled UL channels. With this option, the UE identifier and corresponding antenna panel information may have to be included in the GC DCI, or, alternatively, a GC DCI format may be used for these purposes.

As a second example option may include combining the usage of GC DCI (carrying cancellation indication) and a dedicated signalling to update, on a per UE basis, the antenna panel(s) and transmission parameters to be used for continuing transmission. For the dedicated signalling, dynamic (e.g., via DCI) or semi-static (e.g., RRC signalling or MAC control element (CE)) can be used to indicate and/or update the information of the spare antenna panel that may be used to continue the transmission when receiving the cancellation indication. This option may assume that the preferred spare panel of a UE may not change frequently, and an adjustment every few milliseconds (e.g., 3-8 ms) or even longer may be sufficient. This option may not use significant changes to existing DCI formats (or introduce new DCI formats in case MAC CE signalling is adopted).

Regardless of the first example option or the second example option, the network node may additionally inform the UE of the resource and/or transmission parameters to be used for UL continuous transmission (time and/or frequency resources, modulation and coding scheme (MCS), transmission power, etc.). One possible implementation may be to use the same time and/or frequency resource or the same resources in the frequency domain, but with a configurable time offset. The transmission format may be the same but for a different spare panel. Channel conditions and/or interference conditions may be different between the two panels, and certain embodiments may take these differences into consideration. Depending on whether the resource has been allocated to other UEs, a more advanced interference cancellation receiver may be used at the network node side.

Another possible implementation may be to include the resource information in the GC DCI (e.g., MCS and time and/or frequency resources). In this implementation, the gNB may include, in the MAC CE, the transmission power control (TPC) parameters to be used in case of cancellation, either as an absolute value or relative to the transmit power of the original allocation. As a third possible implementation, the network node may just indicate updated transmission power control (TPC) parameters to increase or decrease the power with respect to the original transmission (e.g., the transmission before receiving the cancellation indication). This may allow for compensation for different channel quality (e.g., signal-to-noise and interference ratio (SINR)) between the panels without needing to adjust the MCS and/or the size of the time and/or frequency allocation.

Certain embodiments may use dedicated DCI. As a first option, a new DCI format can be defined that includes the cancellation indication and the information of the new panel to be used for UL transmission (potentially together with the UL resource). In this option, the UE may be configured to receive both existing GC DCI format 2_4 and a dedicated DCI. If the UE just receives the GC DCI, but not the dedicated DCI, the UE may cancel the transmission, whereas, if the UE receives the dedicated DCI, it may continue the transmission. As a second option, one or multiple DCI formats for UL scheduling (e.g., 0_0, 0_1, 0_2) can be extended to include multiple sets of transmission parameters (e.g., panel identification, radio resource, etc.). The second set of parameters may indicate to the UE which panels and/or resources, etc. to use in case of receiving the cancellation indication. In certain embodiments, antenna panel information can be included as an information element in DCI, e.g., panel identification or implicitly indicated via a SRS resource indicator (SRI) or transmit precoding matrix indication (TPMI).

As indicated above, FIG. 2 is provided as an example. Other examples are possible, according to some embodiments.

Figure 3:
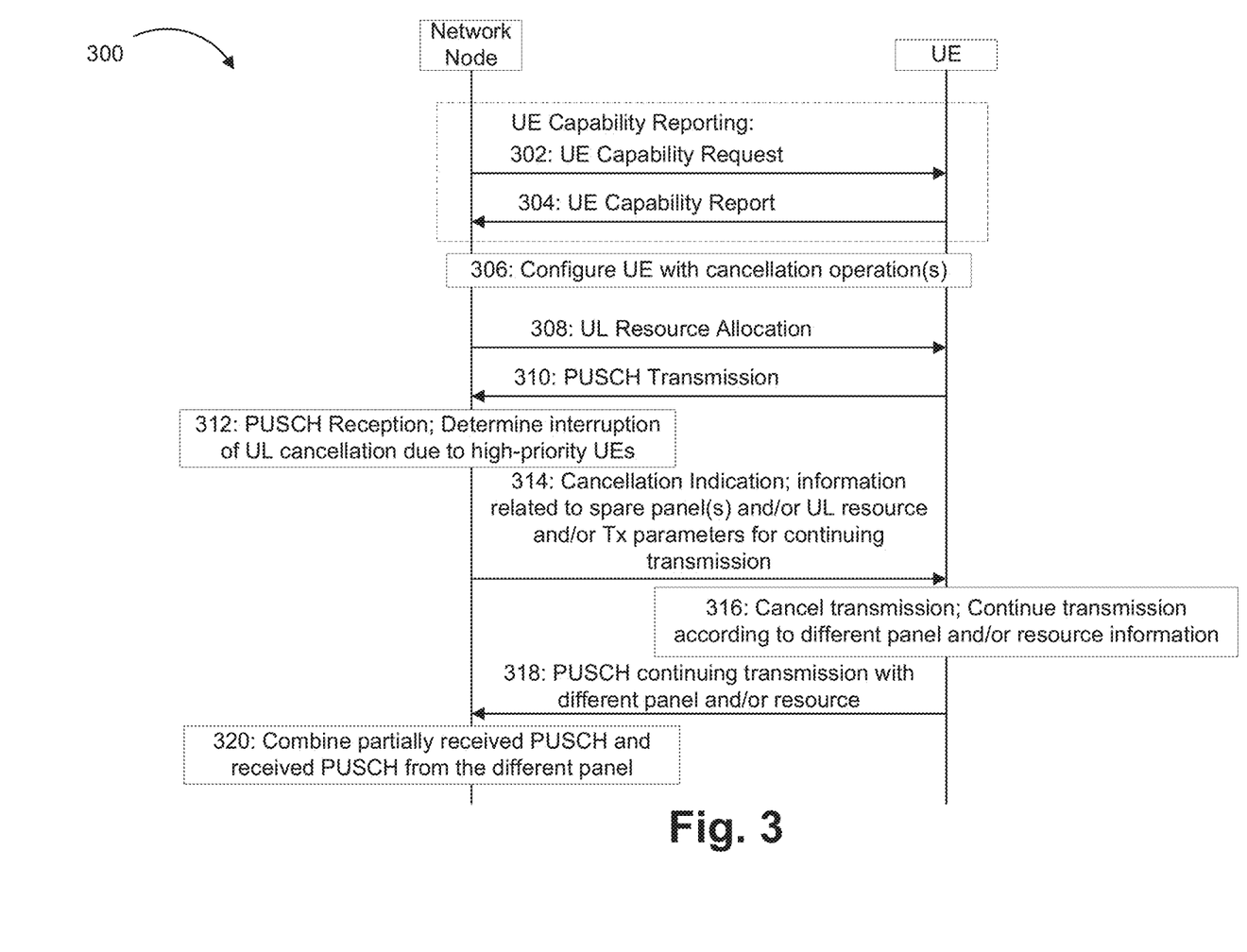
FIG. 3 illustrates an example signal diagram for for multi-panel UE (MPUE) physical uplink shared channel (PUSCH) transmission due to inter-UE prioritization, according to some embodiments.

FIG. 3 illustrates an example signal diagram 300 for MPUE PUSCH transmission due to inter-UE prioritization, according to some embodiments. As illustrated in FIG. 3, the example signal diagram 300 includes a network node and a UE. As illustrated at 302, the network node may send, to the UE, a UE capability request (e.g., a request for information regarding one or more capabilities supported by the UE). As illustrated at 304, the UE may send, to the network node, UE capability report (e.g., a report of information regarding one or more capabilities supported by the UE). In this way, the UE and the network node may exchange information related to the UE panels (e.g., configurations, potential hardware limitation, etc.) and the proposed UE capability for continuing the transmission.

As illustrated at 306, the network node and the UE may configure the UE with cancellation operation(s). For example, if DCI signalling is used to trigger the proposed cancellation operations, the network node may configure the UE with the search spaces where the UE may attempt to decode such DCI, the payload size of such DCI (if not fixed), etc. As illustrated at 308, the network node may transmit, to the UE, a UL resource allocation. For example, the network node may schedule a PUSCH and/or UL grant to the UE for data transmission, e.g., using existing DCI formats 0_0, 0_1, or 0_2.

As illustrated at 310, the UE may perform a PUSCH transmission. As illustrated at 312, the network node may perform PUSCH reception, and may determine to perform an interruption of a UL cancellation due to high-priority UEs. As illustrated at 314, the network node may transmit, to the UE, a cancellation indication. Additionally, or alternatively, the network node may transmit information related to spare panel(s) and/or UL resource and/or Tx parameters for continuing transmission. For example, if higher-priority data has to be transmitted in the UL direction from a second UE, the network node may trigger the UL cancellation indication, and may send additional information on the spare panel(s) to be used for continuing transmission and/or the UL resources to be used.

As illustrated at 316, the UE may cancel the transmission, and may continue transmission according to different panel and/or resource information. For example, at the UE, after detecting the cancellation indication, the UE may switch to another panel for continuing a UL transmission. The resumed UL transmission can take place on different resources or with different transmit power than previous UL transmission(s).

As illustrated at 318, the UE may send, to the network node, PUSCH continuing a transmission with a different panel and/or resource. The continuing transmission may include a retransmission of the same PUSCH or transport block (TB) and/or a continuing transmission of the remaining part of the PUSCH. As illustrated at 320, the network node may combine the partially received PUSCH (e.g., received at 310) and the received PUSCH from the different panel (e.g., received at 318). At the network node, there may be no need to drop the partially received signal, and it can be used together with a later received signal from the other panel.

Certain embodiments may be related to multi-TRP scenarios, where, e.g., the panel for continuing the transmission may point to another non-colocated TRP and combined afterwards in one central node. As described elsewhere herein, certain embodiments can be applied to other scenarios as well. For example, there may be a scenario with intra-UE prioritization and a high-priority channel, such as dynamic grant (DG) PUSCH. In this scenario, the information about spare antennal panel(s) and related UL transmission parameters can be included in DCI scheduling the UL transmission. In case the high priority channel is configured grant (CG) PUSCH, the information for continuing transmission can be configured to the UE in a semi-static manner via RRC signalling, for example. As another embodiment, in a case with Type-2 CG PUSCH, such information may be included in activation DCI.

As described above, FIG. 3 is provided as an example. Other examples are possible, according to some embodiments.

With respect to antenna panel information with GC DCI, the UplinkCancellation parameter within DCI Format 2_4 may provide information on the impacted time-frequency resources (both the physical resource blocks (PRBs) and orthogonal frequency division multiplexing (OFDM) symbols) among others. The DCI format 2_4 may be associated with cyclic redundancy check (CRC) scrambled by a CI-radio network temporary identifier (CI-RNTI) with the content of cancellation indication 1, cancellation indication 2, . . . , cancellation indication N. The size of DCI format 2_4 may be configurable by the higher layer parameter dci-PayloadSizeForCI and the number of bits for each cancellation indication may be configurable by the higher layer parameter ci-PayloadSize. In order to deliver the information about which panel to be used by the impacted UE for continuing transmission, certain embodiments may include adding information at the end of the message, for example, cancellation indication 1, cancellation indication 2, . . . , cancellation indication N, UE #1, panel #2, UE #2, panel #2, UE #3, panel #3 . . . , etc. Since the number of impacted UEs can be dynamic, which may lead to dynamic DCI size, it may be possible that just a limited number of UEs are included. As one example, just five UEs may be included for continuing transmission of the cancelled PUSCH. Such number of UEs can be indicated to the UEs beforehand via a broadcast or multicast message or a unicast message. As another example, such number may be pre-defined.

Figure 4:
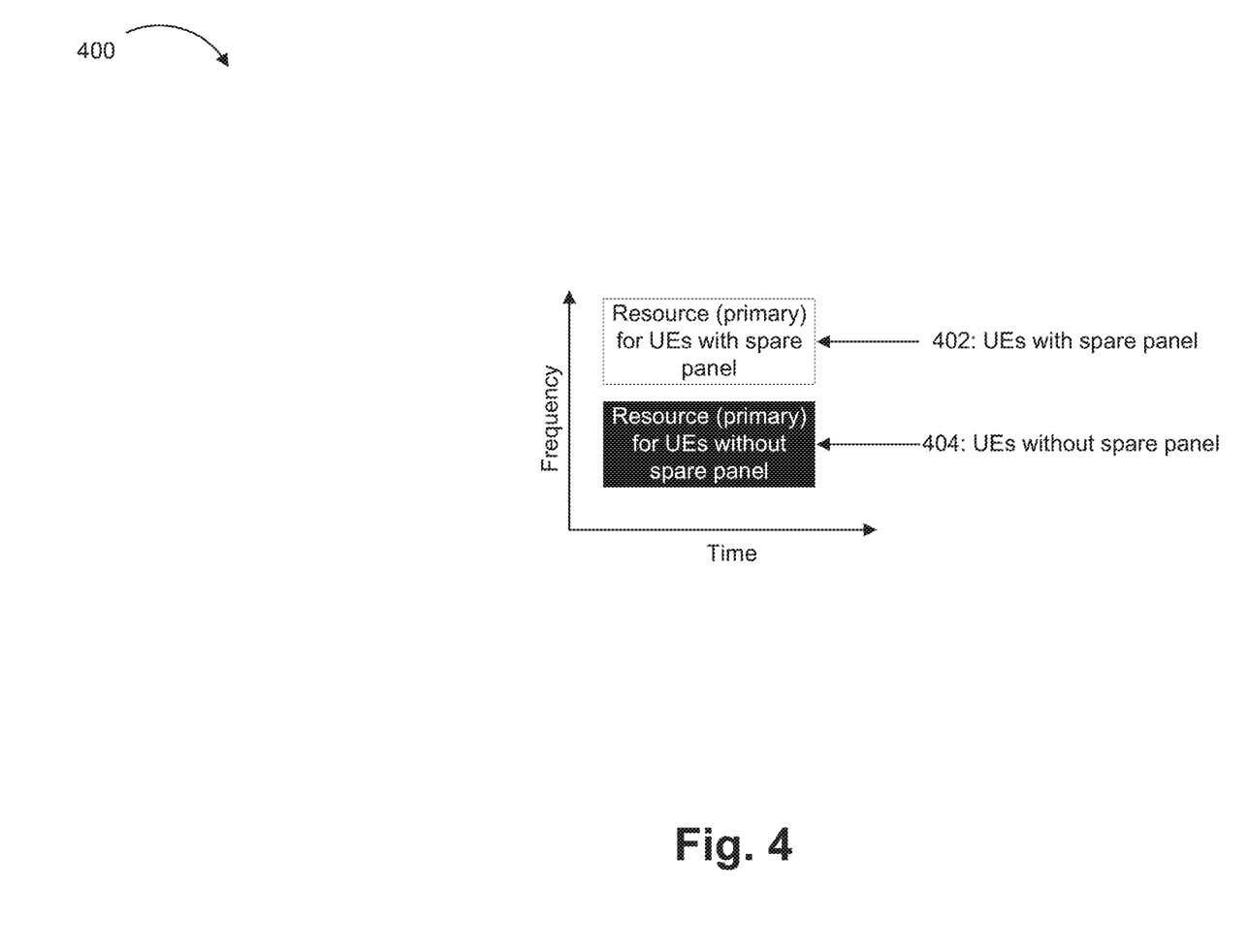
FIG. 4 illustrates an example of resource allocation considering MPUE capability, according to some embodiments.

FIG. 4 illustrates an example 400 of resource allocation considering UE capability, according to some embodiments. Considering resource usage, certain network node implementations may include, during scheduling, consideration the UE capability. From a resource allocation perspective, the network node may classify the resource into two categories: resource for MPUE with spare panel(s), at 402, and resource for UEs without spare panels (either single panel UE or the activated UE panels are occupied), at 404. Depending on the UE capability of supporting multi-panel transmission and/or reception using a spare panel, the network node may allocate UE resources accordingly. When there is a need to cancel the UL transmission from eMBB UEs, the network node may select the resource for UEs with a spare panel to minimize the loss.

When both the network node and the UE support carrier aggregation operation, certain embodiments can be used to indicate the continuing transmission over a different component carrier. As one example, in cases where the UL transmission over one carrier is interrupted due to another high priority UE, the network node may instruct the UE to switch to another component carrier for continuing transmission.

When there are at least two beam pairs (e.g., two resolvable beam directions for transmission/reception respectively), certain embodiments can be used to indicate the continuing transmission over a different beam. As one example, in cases where the UL transmission over one beam is interrupted due to another high priority UE, the network node may instruct the UE to switch to another beam for continuing transmission. In this case, certain embodiments can be used to indicate the continuing transmission over a different beam. As one example, in cases where the UL transmission over one beam is interrupted due to another high priority UE, the network node may instruct the UE to switch to another beam for continuing transmission and the beam information can be carried via, e.g., SRI, TPMI, etc.

As described above, FIG. 4 is provided as an example. Other examples are possible, according to some embodiments.

Figure 5:
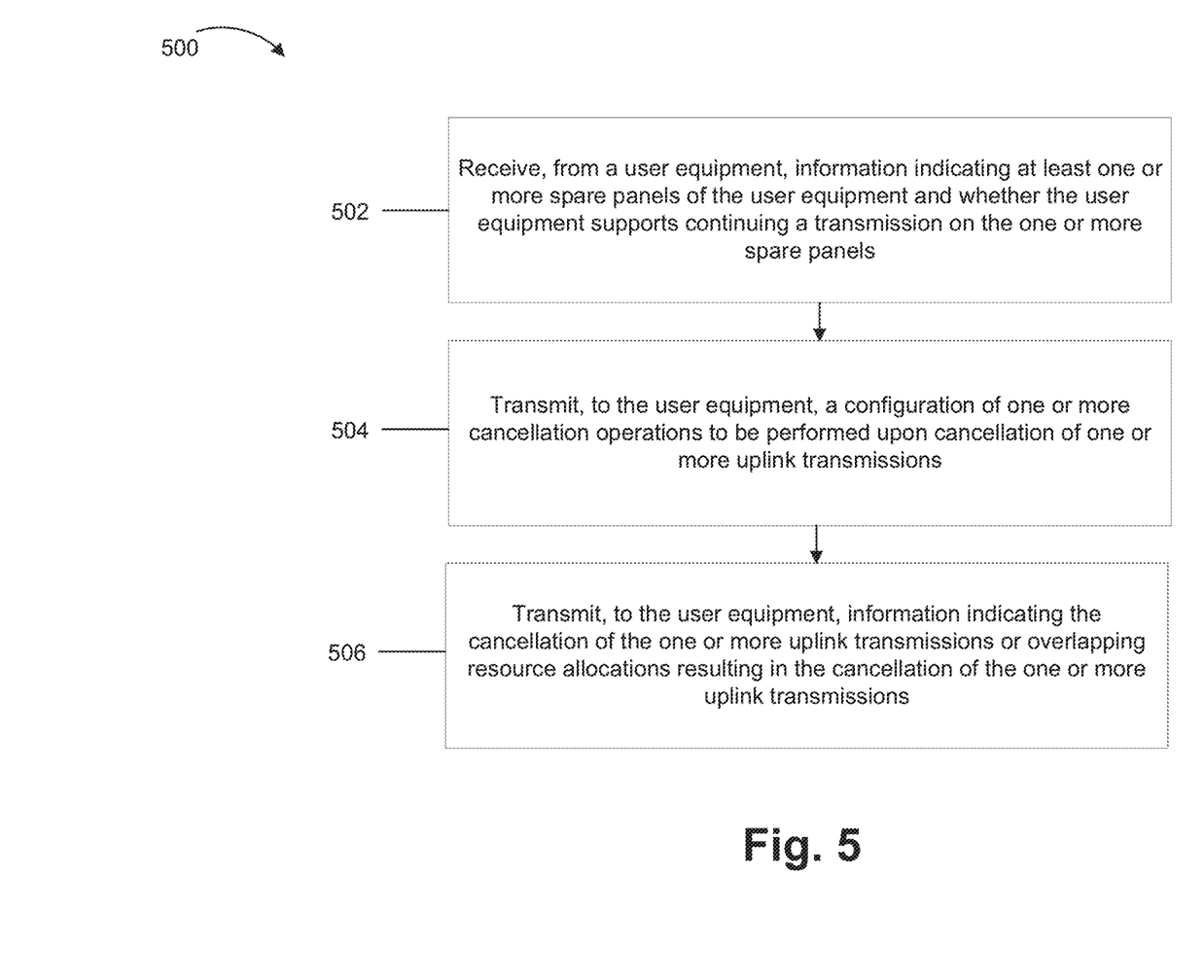
FIG. 5 illustrates an example flow diagram of a method, according to some embodiments.

FIG. 5 illustrates an example flow diagram of a method 500, according to some embodiments. For example, FIG. 5 may illustrate example operations of a network node (e.g., apparatus 10 illustrated in, and described below with respect to, FIG. 7a). Some of the operations illustrated in FIG. 5 may be similar to some operations shown in, and described with respect to, FIGS. 1-4.

In an embodiment, the method may include, at 502, receiving, from a user equipment, information indicating at least one or more spare panels of the user equipment and whether the user equipment supports continuing a transmission on the one or more spare panels. For example the receiving at 502 may be similar to that described at 202 of FIG. 2. The method may include, at 504, transmitting, to the user equipment, a configuration of one or more cancellation operations to be performed upon cancellation of one or more uplink transmissions. For example, the transmitting at 504 may be similar to that described at 204 of FIG. 2. The method may include, at 506, transmitting, to the user equipment, information indicating the cancellation of the one or more uplink transmissions or overlapping resource allocations resulting in the cancellation of the one or more uplink transmissions (e.g., in an intra-UE prioritization case where the network node does not provide a cancellation indication).

The method illustrated in FIG. 5 may include one or more additional aspects described below or elsewhere herein. In some embodiments, the method 500 may further include receiving the one or more cancelled uplink transmissions via the one or more spare panels. In some embodiments, the method 500 may further include transmitting, to the user equipment, information indicating a subset of the one or more spare panels on which the one or more cancelled uplink transmissions can be transmitted. In some embodiments, after transmitting the information indicating the subset, the method 500 may include receiving the one or more cancelled uplink transmissions via the subset of the one or more spare panels. In some embodiments, the transmitting of the information indicating the subset may further include transmitting the information indicating the subset in connection with the transmitting of the configuration, or transmitting the information indicating the subset in connection with the transmitting of the information indicating the cancellation.

In some embodiments, the information indicating the one or more spare panels may further include at least one of one or more panel identifiers, one or more panel-dedicated channel quality indicator reports, or one or more panel-dedicated sounding reference signal resources or one or more SRIs or one or more TPMIs. In some embodiments, the method 500 may further include transmitting an indication of one or more resources or transmission parameters for a transmission of the one or more cancelled uplink transmissions, and receiving the one or more cancelled uplink transmissions via the one or more spare panels according to the one or more resources or transmission parameters.

In some embodiments, the transmitting at 504 may further include transmitting the configuration via downlink control information, transmitting the configuration via a medium access control control element, or transmitting the configuration via radio resource control signalling. In some embodiments, the configuration of the one or more cancellation operations may further include a configuration of one or more search spaces where the user equipment can attempt to decode the downlink control information or a payload size of the downlink control information. In some embodiments, the method 500 may further include transmitting a scheduling of one or more physical uplink shared channels or one or more uplink grants for the one or more cancelled uplink transmissions. In some embodiments, the method may further include receiving one or more other uplink transmissions received via one or more other panels of the user equipment, determining to not drop the one or more other uplink transmissions received via the one or more other panels of the user equipment, and processing the one or more uplink transmissions and the one or more other uplink transmissions. In some embodiments, the method 500 may include transmitting, to the user equipment, information indicating whether the network node supports receiving a continued transmission from one or more spare panels of the UE.

As described above, FIG. 5 is provided as an example. Other examples are possible according to some embodiments.

Figure 6:
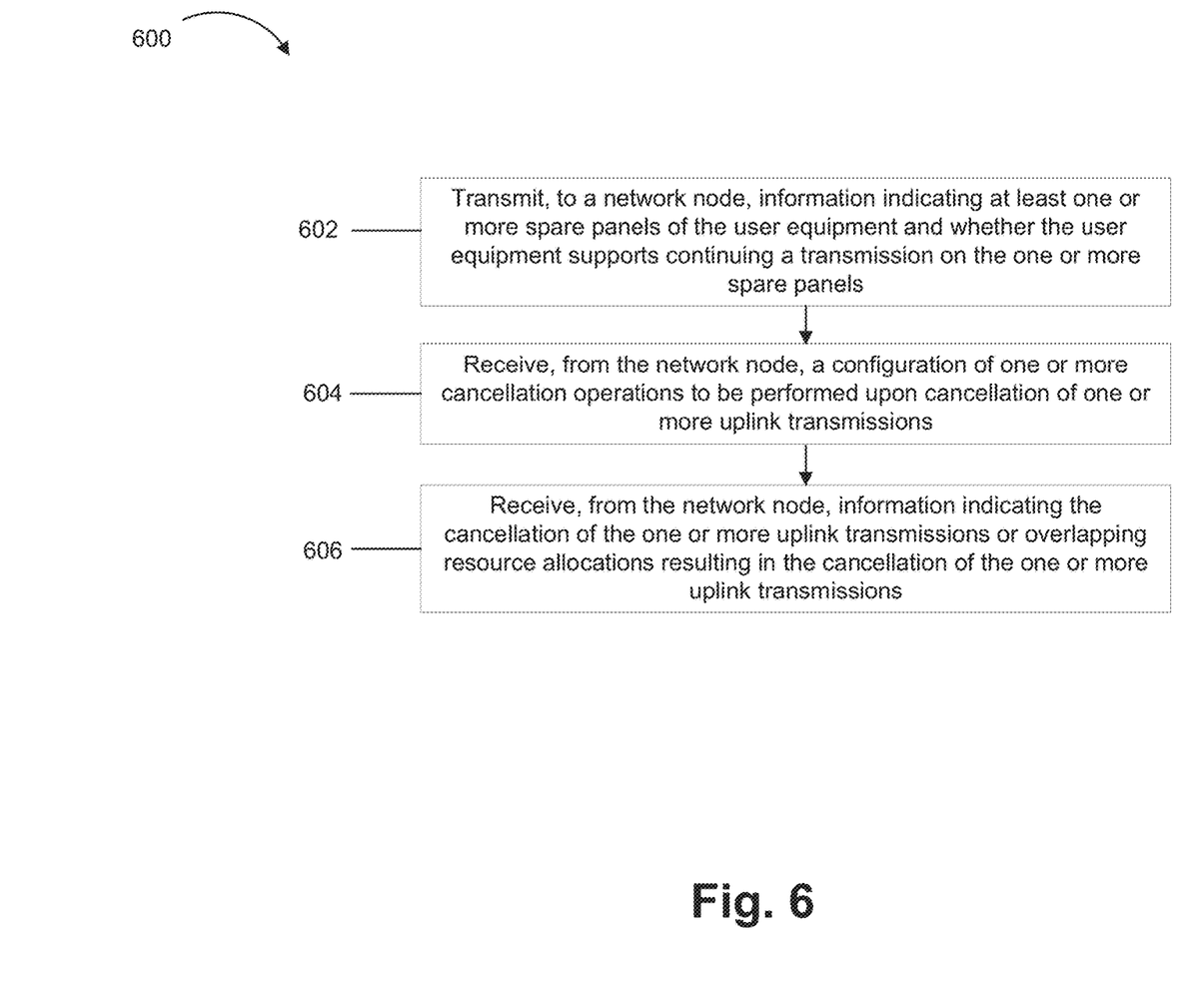
FIG. 6 illustrates an example flow diagram of a method, according to some embodiments.

FIG. 6 illustrates an example flow diagram of a method 600, according to some embodiments. For example, FIG. 6 may illustrate example operations of a UE (e.g., apparatus 20 illustrated in, and described with respect to, FIG. 7b). Some of the operations illustrated in FIG. 6 may be similar to some operations shown in, and described with respect to, FIGS. 1-4.

In an embodiment, the method may include, at 602, transmitting, to a network node, information indicating at least one or more spare panels of the user equipment and whether the user equipment supports continuing a transmission on the one or more spare panels. For example, the transmitting at 602 may be similar to that described at 202 of FIG. 2. The method 600 may further include, at 604, receiving, from the network node, a configuration of one or more cancellation operations to be performed upon cancellation of one or more uplink transmissions. For example, the receiving at 604 may be similar to that described at 204 of FIG. 2. The method 600 may further include, at 606, receiving, from the network node, information indicating the cancellation of the one or more uplink transmissions or overlapping resource allocations resulting in the cancellation of the one or more uplink transmissions.

The method illustrated in FIG. 6 may include one or more additional aspects described below or elsewhere herein. In some embodiments, the method 600 may further include transmitting the one or more cancelled uplink transmissions via the one or more spare panels. In some embodiments, the method 600 may further include receiving, from the network node, information indicating a subset of the one or more spare panels on which the one or more cancelled uplink transmissions can be transmitted. In some embodiments, the transmitting of the one or more cancelled uplink transmissions may further include transmitting the one or more cancelled uplink transmissions via the subset of the one or more spare panels. In some embodiments, the receiving of the information indicating the subset may further include receiving the information indicating the subset in connection with the receiving of the configuration, or receiving the information indicating the subset in connection with the receiving of the information indicating the cancellation.

In some embodiments, the information indicating the one or more spare panels may further comprise at least one of one or more panel identifiers, one or more panel-dedicated channel quality indicator reports, or one or more panel-dedicated sounding reference signal resources or one or more SRIs or one or more TPMIs. In some embodiments, the method 600 may further include receiving an indication of one or more resources or transmission parameters for a transmission of the one or more cancelled uplink transmissions, and transmitting the one or more cancelled uplink transmissions via the one or more spare panels according to the one or more resources or transmission parameters.

In some embodiments, the receiving at 604 may further include receiving the configuration via downlink control information, receiving the configuration via a medium access control control element, or receiving the configuration via radio resource control signalling. In some embodiments, the configuration of the one or more cancellation operations may further include a configuration of one or more search spaces where the user equipment can attempt to decode the downlink control information or a payload size of the downlink control information. In some embodiments, the method 600 may further include receiving a scheduling of one or more physical uplink shared channels or one or more uplink grants for the one or more cancelled uplink transmissions. In some embodiments, the method 600 may further include transmitting one or more other uplink transmissions received via one or more other panels of the user equipment.

As described above, FIG. 6 is provided as an example. Other examples are possible according to some embodiments.

In this way, certain embodiments described above may include providing, by the UE, to the network information indicating the UE's spare panel(s), as well as whether the UE supports continuing the transmission on a different panel. The network may configure the UE with a cancellation behavior, e.g., the search spaces where the UE may attempt to decode a DCI, if DCI signaling is used to trigger the proposed cancellation behavior. The network may transmit information to the UE indicating the need of the cancellation of UL transmission of data. The UE may be signaled as to which spare panel can be used for continuing transmission, as well as a resource or transmission parameters for continuing the transmission, in case there is a need to interrupt an ongoing UL transmission to accommodate higher-priority traffic.

Figure 7A:
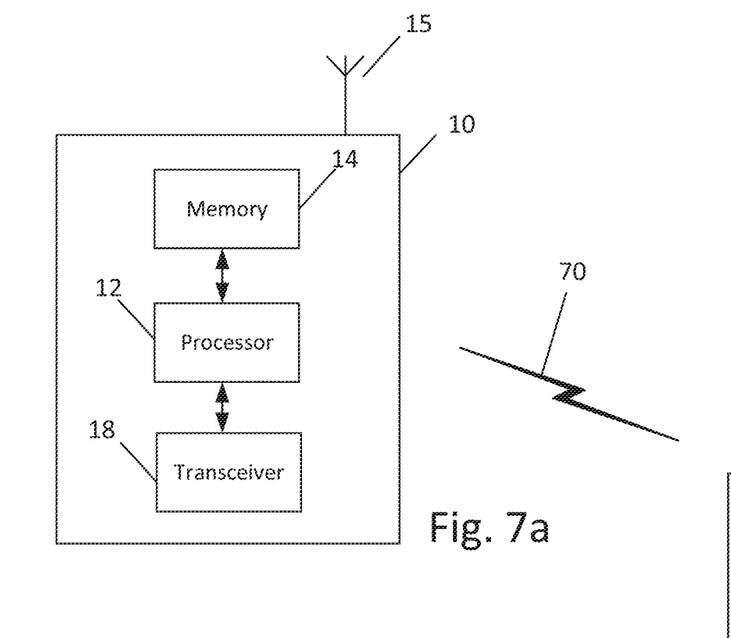
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-5. For instance, apparatus 10 may be controlled by memory 14 and processor 12 to perform the method of FIG. 5.

Figure 7B:
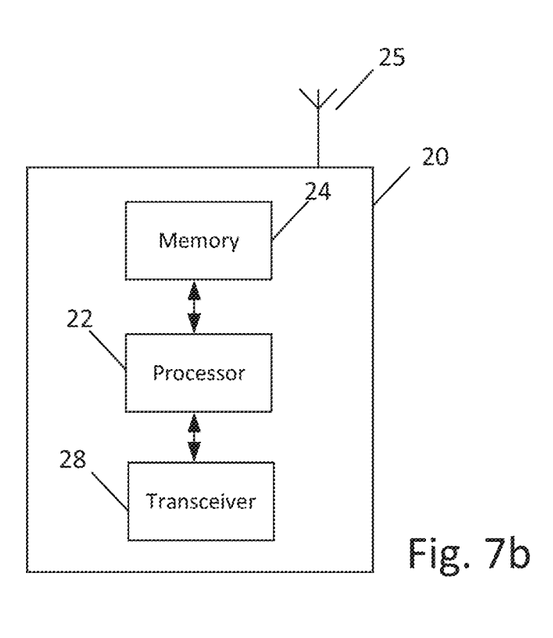
FIG. 7b illustrates an example block diagram of an apparatus, according to another embodiment.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-4 and 6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIG. 5 or 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is a reduction or elimination of excess dropping or cancellation of uplink transmissions, which conserves computing resources of a UE and/or a network node that would otherwise be consumed as a result of the excess dropping and/or cancellation, improves communications between the UE and the network node, and/or the like. Another example benefit includes increasing the capacity of the air interface by avoiding excessive dropping and/or cancellation in cases there are overlapping allocated resources Accordingly, the use of some example embodiments results in improved functioning of communications networks and their nodes and, therefore constitute an improvement at least to the technological field of multi-panel UE transmissions, among others.

In some example embodiments, the functionality of any of the methods, processes, signalling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

3GPP 3rd Generation Partnership Project.
5G Fifth Generation

BS Base station
DCI Downlink control information
DL Downlink
GC DCI Group common DCI
gNB next generation node B
MAC Media access control
MAC CE MAC Control element
MCS Modulation coding schemes
NR New radio
PDCCH Physical downlink control channel
PDSCH Physical downlink shared channel
PRB Physical resource block
PUCCH Physical uplink control channel
PUSCH Physical uplink shared channel
RAN Radio access network
RI Rank indicator
RRC Radio resource control
SRI SRS resource indicator
UE User Equipment
UL Uplink
URLLC Ultra-reliable low-latency communications

We claim:

1. An apparatus, comprising:
   at least one processor; and
   at least one memory including computer program code,
   wherein the at least one memory and the computer program code are configured to, with the at least one processor, cause the apparatus at least to:
   transmit, to a network node, information indicating at least one or more spare panels of the apparatus and whether the apparatus supports continuing a transmission on the one or more spare panels;
   receive, from the network node, a configuration of one or more cancellation operations to be performed upon cancellation of one or more uplink transmissions; and
   receive, from the network node, information indicating the cancellation of the one or more uplink transmissions or overlapping resource allocations resulting in the cancellation of the one or more uplink transmissions;
   receive, from the network node, information indicating a subset of the one or more spare panels on which the one or more cancelled uplink transmissions can be transmitted; and
   transmit the one or more cancelled uplink transmissions via the subset of the one or more spare panels.

2. The apparatus according to claim 1, wherein the at least one memory and the computer program code are configured to, with the at least one processor, further cause the apparatus, when receiving the information indicating the subset, at least to:
   receive the information indicating the subset in connection with the receiving of the configuration, or
   receive the information indicating the subset in connection with the receiving of the information indicating the cancellation.

3. The apparatus according to claim 1, wherein the information indicating the one or more spare panels further comprises at least one of:
   one or more panel identifiers,
   one or more panel-dedicated channel quality indicator reports,
   one or more panel-dedicated sounding reference signal resources,
   one or more sounding reference signal resource indicators, or
   one or more transmit precoding matrix indexes.

4. The apparatus according to claim 1, wherein the at least one memory and the computer program code are configured to, with the at least one processor, further cause the apparatus at least to:
   receive an indication of one or more resources or transmission parameters for a transmission of the one or more cancelled uplink transmissions; and
   transmit the one or more cancelled uplink transmissions via the one or more spare panels according to the one or more resources or transmission parameters.

5. The apparatus according to claim 1, wherein the at least one memory and the computer program code are configured to, with the at least one processor, further cause the apparatus, when receiving the configuration of the one or more cancellation operations, at least to:
   receive the configuration via downlink control information,
   receive the configuration via a medium access control control element, or
   receive the configuration via radio resource control signalling.

6. The apparatus according to claim 5, wherein the configuration of the one or more cancellation operations further comprises:
   a configuration of one or more search spaces where the apparatus can attempt to decode the downlink control information or a payload size of the downlink control information.

7. The apparatus according to claim 1, wherein the at least one memory and the computer program code are configured to, with the at least one processor, further cause the apparatus at least to:
   receive a scheduling of one or more physical uplink shared channels or one or more uplink grants for the one or more cancelled uplink transmissions.

8. The apparatus according to claim 1, wherein the at least one memory and the computer program code are configured to, with the at least one processor, further cause the apparatus at least to:
   transmit one or more other uplink transmissions received via one or more other panels of the apparatus.

9. An apparatus, comprising:
   at least one processor; and
   at least one memory including computer program code,
   wherein the at least one memory and the computer program code are configured to, with the at least one processor, cause the apparatus at least to:
   receive, from a user equipment, information indicating at least one or more spare panels of the user equipment and whether the user equipment supports continuing a transmission on the one or more spare panels;
   transmit, to the user equipment, a configuration of one or more cancellation operations to be performed upon cancellation of one or more uplink transmissions;
   transmit, to the user equipment, information indicating the cancellation of the one or more uplink transmissions or overlapping resource allocations resulting in the cancellation of the one or more uplink transmissions;
   transmit, to the user equipment, information indicating a subset of the one or more spare panels on which the one or more cancelled uplink transmissions can be transmitted; and
   receive the one or more cancelled uplink transmissions via the subset of the one or more spare panels.

10. The apparatus according to claim 9, wherein the information indicating the one or more spare panels further comprises at least one of:

one or more panel identifiers,
one or more panel-dedicated channel quality indicator reports,
one or more panel-dedicated sounding reference signal resources,
one or more sounding reference signal resource indicators, or
one or more transmit precoding matrix indexes.

11. The apparatus according to claim 9, wherein the at least one memory and the computer program code are configured to, with the at least one processor, further cause the apparatus at least to:
transmit an indication of one or more resources or transmission parameters for a transmission of the one or more cancelled uplink transmissions; and
receive the one or more cancelled uplink transmissions via the one or more spare panels according to the one or more resources or transmission parameters.

12. The apparatus according to claim 9, wherein the at least one memory and the computer program code are configured to, with the at least one processor, further cause the apparatus, when transmitting the configuration of the one or more cancellation operations, at least to:
transmit the configuration via downlink control information,
transmit the configuration via a medium access control control element, or
transmit the configuration via radio resource control signalling.

13. The apparatus according to claim 12, wherein the configuration of the one or more cancellation operations further comprises:
a configuration of one or more search spaces where the user equipment can attempt to decode the downlink control information or a payload size of the downlink control information.

14. The apparatus according to claim 9, wherein the at least one memory and the computer program code are configured to, with the at least one processor, further cause the apparatus at least to:
transmit a scheduling of one or more physical uplink shared channels or one or more uplink grants for the one or more cancelled uplink transmissions.

15. The apparatus according to claim 9, wherein the at least one memory and the computer program code are configured to, with the at least one processor, further cause the apparatus at least to:
receive one or more other uplink transmissions received via one or more other panels of the user equipment;
determine to not drop the one or more other uplink transmissions received via the one or more other panels of the user equipment; and
process the one or more uplink transmissions and the one or more other uplink transmissions.

16. An apparatus, comprising: at least one processor; and at least one memory including computer program code, wherein the at least one memory and the computer program code are configured to, with the at least one processor, cause the apparatus at least to: receive, from a user equipment, information indicating at least one or more spare panels of the user equipment and whether the user equipment supports continuing a transmission on the one or more spare panels; transmit, to the user equipment, a configuration of one or more cancellation operations to be performed upon cancellation of one or more uplink transmissions; and transmit, to the user equipment, information indicating the cancellation of the one or more uplink transmissions or overlapping resource allocations resulting in the cancellation of the one or more uplink transmissions; transmit, to the user equipment, information indicating a subset of the one or more spare panels on which the one or more cancelled uplink transmissions can be transmitted; and receive the one or more cancelled uplink transmissions via the subset of the one or more spare panels, wherein the at least one memory and the computer program code are configured to, with the at least one processor, further cause the apparatus, when transmitting the information indicating the subset, at least to: transmit the information indicating the subset in connection with the transmitting of the configuration, or transmit the information indicating the subset in connection with the transmitting of the information indicating the cancellation.

* * * * *